Sept. 17, 1957 W. J. FISHER ET AL 2,806,616
TUBULAR TIRE CARRIER
Original Filed Feb. 7, 1952
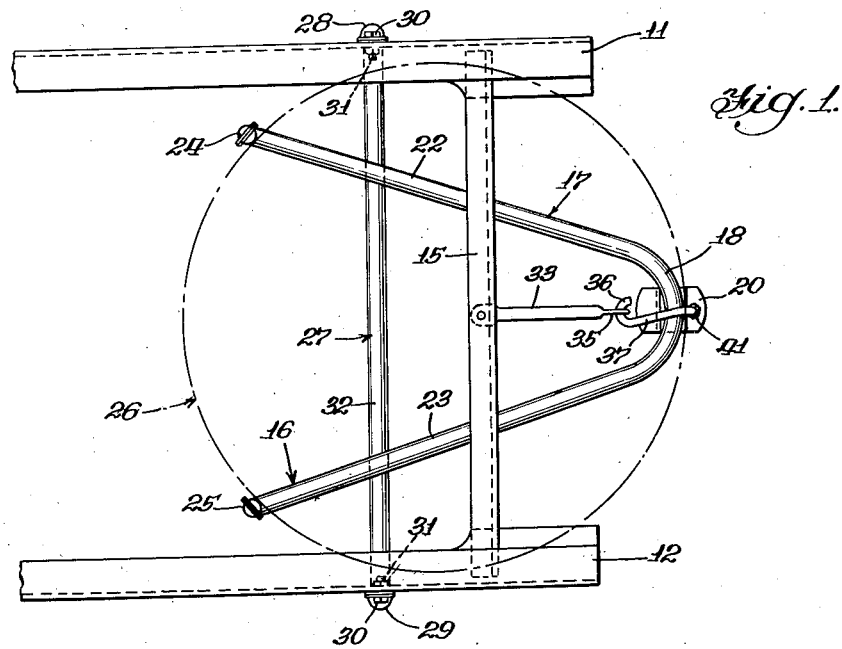
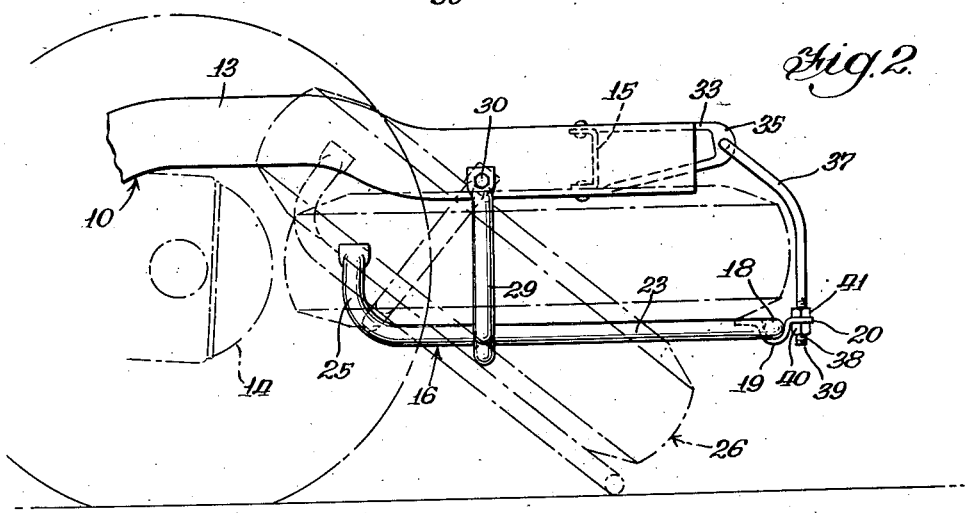
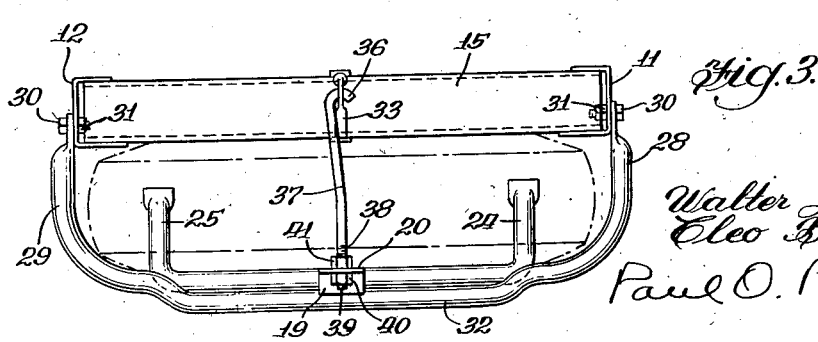
INVENTORS.
Walter J. Fisher
Cleo B. Sheerin
Paul O. Pippel
Atty.

United States Patent Office 2,806,616
Patented Sept. 17, 1957

2,806,616
TUBULAR TIRE CARRIER

Walter J. Fisher and Cleo B. Sheerin, Fort Wayne, Ind., assignors to International Harvester Company, a corporation of New Jersey Original application February 7, 1952, Serial No. 270,424, now Patent No. 2,743,831, dated May 1, 1956. Divided and this application October 7, 1955, Serial No. 539,131

1 Claim. (Cl. 214—254)

This invention relates to a tire carrier construction for vehicles and more particularly to a new and improved spare tire carrier construction adapted to be mounted at the rear of a conventional automotive vehicle such as a motor truck. The present application is a division of patent application Serial No. 270,424, filed February 7, 1952, and now Patent No. 2,743,831, entitled Tubular Tire Carrier and is assigned to the assignee of the present application.

It has become common practice in the operation of commercial vehicles such as trucks or the like to carry a spare tire and wheel unit for emergency use. Because cargo space is critical in commercial vehicles many devices have been constructed by which the spare tire and wheel unit may be compactly stored in an elevated or cramped position beneath the body or cargo space of the vehicle and yet render it conveniently accessible for removal from and replacement thereon of a wheel and tire unit quickly and easily. However, the tire carriers of the underslung type described above have one serious drawback. They are either complex structures having many parts and are thus costly to manufacture or they are flimsy structures which lack the stability and rigidity needed for long periods of trouble-free efficient operation. It is, therefore, the primary objective of the present invention to provide a tire carrier construction which obviates the disadvantages of prior tire carriers as mentioned above.

Another object is the provision of a strong light weight tire carrier frame structure which includes a longitudinally disposed V-shaped section for supporting the tire.

A further object is the provision of a novel clamping device for securing the tire carrier frame structure in its raised position which is quickly and safely engageable with a portion of the tubular frame structure.

Still another object is to provide a pair of vertical sections which are integrally formed with a longitudinally disposed V-shaped sections for limiting the forward movement of the tire and wheel unit being carried by the tire carrier structure to thus correctly position the tire and wheel unit on the tire carrier frame structure.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a plan view of a tire carrier embodying the invention attached to the rear portion of an automotive vehicle frame;

Figure 2 is a side elevational view of the structure shown in Figure 1, the dotted lines illustrating the tire carrier in its lowered position for inserting or removing a tire and wheel unit; and Figure 3 is a rear elevational view of the structure shown in Figures 1 and 2.

Referring to the drawings in detail wherein like reference characters designate like elements throughout the various views, there is shown a vehicle frame 10 having a pair of channel-shaped longitudinally extending transversely spaced side sill members 11, 12. The side sill members 11, 12 are formed with a humped portion 13 to provide clearance over the rear axle structure 14. Each spring assemblies not shown resiliently connect the rear axle structure 14 to the frame 10 in a conventional manner. The side sill members 11, 12 are interconnected by means of a plurality of transversely extending cross members, only one cross member 15 is shown in the drawings.

The tire carrier frame structure designated in its entirety by reference character 16 includes a longitudinally disposed V-shaped section 17 which is formed from a single piece of tubular steel. The apex 18 of the V-shaped section 17 is a rearwardmost portion of the frame structure 16 and has rigidly secured thereto as by welding a channel-shaped bracket 19 having a short extension 20. The extension 20 is provided with an aperture for a purpose which will be explained hereinafter. However, it is to be understood that the channel-shaped bracket 19 is engageable by a clamping device to be described in detail hereinafter for supporting the tire carrier frame structure 16 in its raised or clamped position as shown in Figure 2.

The legs 22, 23 of the V-shaped section 17 extend forwardly from the apex 18 and diverge toward side sill members 11, 12 respectively. Vertical sections 24, 25 having a length at least equal to the thickness of the tire and wheel unit 26 to be carried by the tire carrier frame structure 16 extend respectively normally from the legs 22, 23. It will be readily seen by noting Figure 1 that the vertical sections 24, 25 limit the forward movement of the tire and wheel unit 26 by abutting the outer periphery of the same at two transversely spaced points.

Extending transversely between the side sill members 11, 12 is a U-shaped tubular member 27. The vertical legs 28, 29 of the U-shaped member 27 are pivotally connected to the side sill members 11, 12 respectively by means of bolts 30 and nuts 31. The bight section 32 of the U-shaped member 27 passes beneath the V-shaped section 17 intermediate the vertical sections 24, 25 and the apex 18 and is welded thereto. From the foregoing it will be obvious that the frame structure 16 is capable of swinging about a transverse axis through bolts 30 and since the transverse pivotal axis is longitudinally spaced between the vertical sections 24, 25 and the apex 18 the spare tire and wheel unit 26 is counterbalanced and thus a very little effort is required on the part of the vehicle operator to raise or lower the tire carrier frame structure 16 with a spare tire and wheel unit 26 mounted thereon.

A rearwardly extending bracket 33 is riveted to cross member 15 midway between the side sill members 11, 12. An aperture is provided in the rearward end 35 of the bracket 33 for pivotally receiving the hook-shaped end 36 of a rod-like supporting member 37. This permits the supporting member to be pivoted with respect to a transverse axis and also with respect to a longitudinal axis substantially parallel to the sill members 11 and 12. Threads, indicated by reference character 38, are formed on the opposite end 39 of the supporting member 37 which are engageable by a pair of nuts 40, 41. It will be noted that with the lower clamping nut 40 removed the lower end 39 of the supporting member 37 is insertable in the aperture formed in the extension 20. The clamping nut 40 can then be screwed on the supporting member 37 to clamp the extension 20 between it and the nut 41 and thereby support the V-shaped section 17 as shown in Figure 2. The upper nut 41 acts as an adjustable stop since its location along the supporting member 37 may be varied to insure a snug positioning of the tire and wheel unit 26 between the V-shaped section 17 and the underside of the side sill members 11, 12 and the cross member 15 when the tire carrier structure is in its raised or clamped position.

In operation when the operator desires to insert a spare tire or a tire and wheel unit into the carrier, frame structure 16 is swung to the lowered position shown by dotted lines in Figure 2. The spare tire and wheel unit 26 is thrust into position in engagement with the vertical sections 24, 25 and the frame structure 16 together with the tire and wheel unit 26 is tilted upwardly into the position shown by full lines in Figure 2. Thereafter the supporting member 37 is swung clockwise as viewed in Figure 2 and the lower end 39 thereof is caused to enter the aperture 21 formed in the extension 20. It is to be understood that the lower nut 40 was previously removed from the supporting member 37 prior to the upward tilting or swinging of the tire carrier frame structure 16. The operator then threads the nut 40 on the lower end 39 of the rod 37 with a suitable wrench which moves the extension 20 upwardly along the supporting member 37 and raises the frame structure 16 to the substantially horizontal raised position shown in Figure 2 where the extension tightly engages the upper clamping nut 41. The vertical sections 24, 25 position the tire and wheel unit 26 to avoid excessive shifting movement of the same with respect to the vehicle frame 10 in a horizontal direction during operation of the vehicle. Similarly, vertical movement of the tire and wheel unit 26 with respect to the vehicle frame 10 is substantially eliminated by having the unit 26 confined between the V-shaped section 17 and the underside of the cross member 15. To remove the tire and wheel unit 26 it is only necessary to unthread the clamping nut 40 from the supporting member 37 to allow the bracket extension 20 to become disengaged from the supporting member 37. The entire frame structure 16 and wheel and tire unit 26 may then pivot to the dotted line position shown in Figure 2 and the tire and unit may be easily removed from the frame structure 16.

The embodiment of the invention chosen for the purposes of illustration and description herein is that preferred for achieving the objects of the invention and developing the utility thereof in the most desirable manner, due regard being had to existing factors of economy, simplicity of design and construction, production methods and improvements sought to be effected. It will be appreciated, therefore, that the particular structural and functional aspects emphasized herein are not intended to exclude but rather to suggest such other adaptations and modifications of the invention as fall within the spirit and scope of the invention as defined by the appended claims.

What is claimed is:

A tire carrier construction for vehicles having a longitudinal frame including a pair of transversely spaced side sill members comprising, a tire carrier frame structure including a tubular member having a substantially V-shaped longitudinally disposed section, integral vertical sections extending normally toward said vehicle frame from the legs of said V section, and a transversely extending U-shaped member rigidly secured to said V-shaped section intermediate said vertical sections and the apex of said V-shaped section, said U-shaped member having its ends pivotally connected to respective side sill members whereby the tire carrier structure is swingable about a transverse horizontal axis with respect to the vehicle frame from a first position wherein a tire may be placed on or removed from the tire carrier frame structure to a clamped position, said vertical sections being disposed substantially inwardly of the side sills and with respect to the points of connection of the U-shaped member, said vertical sections being adapted to abut the periphery of the tire carried by the tire carrier frame structure for limiting forward movement thereof with respect to said tire carrier frame structure; and clamping means for releasably maintaining said tire carrier frame structure in said clamped position including a supporting member having one end pivotally connected to said vehicle frame to provide for swinging movement of said supporting member about an axis substantially parallel to the longitudinal frame and about a horizontal axis extending transversely of said sill members, said supporting member being provided at its opposite end with a threaded portion, a bracket rigidly secured to the apex of said V-shaped section, said bracket having an extension provided with an aperture for slidably receiving the threaded portion of said supporting member, and a clamping nut cooperable with said threaded portion and abutting said extension for moving said bracket along said supporting member.

References Cited in the file of this patent

UNITED STATES PATENTS

| | | |
|---|---|---|
| 1,672,356 | Wasserfallen | June 5, 1928 |
| 2,417,952 | Selzer et al. | Mar. 25, 1947 |
| 2,698,118 | Dickason | Dec. 28, 1954 |